United States Patent [19]

Buchan et al.

[11] Patent Number: 5,023,012

[45] Date of Patent: Jun. 11, 1991

[54] PURIFICATION OF WATER

[75] Inventors: Pieter W. W. Buchan, 68 Second Street, Linden, Johannesburg, Tranvsvaal Province; Leon Buchan, Kameeldrift District, both of South Africa

[73] Assignee: Pieter Walter William Buchan, Johannesburg, South Africa

[21] Appl. No.: 385,553

[22] Filed: Jul. 25, 1989

Related U.S. Application Data

[63] Continuation-in-part of Ser. No. 107,921, Oct. 9, 1987, abandoned, which is a continuation of Ser. No. 830,493, Feb. 19, 1986, abandoned, which is a continuation of Ser. No. 658,056, Oct. 4, 1984, abandoned, which is a continuation of Ser. No. 379,703, May 19, 1982, abandoned.

[30] Foreign Application Priority Data

Oct. 4, 1988 [ZA]  South Africa ..................... 88/7442

[51] Int. Cl.$^5$ ........................... C02F 1/56; B03D 3/06
[52] U.S. Cl. ...................................... 25/181; 252/175; 252/176; 252/180; 210/725; 210/728; 210/730; 210/732; 210/734
[58] Field of Search .............. 252/175, 176, 180, 181; 210/725, 728, 730, 732, 734

[56] References Cited

U.S. PATENT DOCUMENTS

| | | | |
|---|---|---|---|
| 3,350,304 | 10/1967 | Bacon | 210/52 |
| 3,428,558 | 2/1969 | Murphy | 218/59 |
| 3,511,778 | 5/1970 | Libor et al. | 210/46 |
| 3,515,666 | 6/1970 | Bacon | 210/52 |
| 3,541,009 | 11/1970 | Arendt et al. | 210/52 |
| 3,723,310 | 3/1973 | Lang et al. | 210/53 |
| 4,302,350 | 11/1981 | Callicott | 252/180 |
| 4,747,978 | 5/1988 | Loehr et al. | 252/175 |

FOREIGN PATENT DOCUMENTS

| | | |
|---|---|---|
| 0066421 | 1/1987 | European Pat. Off. . |
| 48-33181 | 10/1973 | Japan . |
| 56-70893 | 6/1981 | Japan . |
| 703964 | 2/1954 | United Kingdom . |
| 1369317 | 10/1974 | United Kingdom . |
| 1381678 | 1/1975 | United Kingdom . |
| 1382537 | 2/1975 | United Kingdom . |
| 1461334 | 1/1977 | United Kingdom . |
| 1527010 | 1/1978 | United Kingdom . |
| 1509042 | 4/1978 | United Kingdom . |
| 1512481 | 6/1978 | United Kingdom . |

OTHER PUBLICATIONS

Degrement, "Coagulation Flocculation, Sedimentation", Water Treatment Handbook, pp. 111-119 (1973).
Ryan, Water Treatment and Purification, pp. 14-5 (1937).

Primary Examiner—Hoa Van Le
Attorney, Agent, or Firm—Arnold, White & Durkee

[57] ABSTRACT

A composition for the purification of water includes a suitable coagulant for coagulating solid impurities dispersed in the water to form flocs and an organic hydrophilic colloid capable, when dispersed in the water, of absorbing large quantities of water to form a sol for aggregating the flocs. The proportion of organic hydrophilic colloid in the composition is such that when the composition is used to purify the intended quantity of water, the organic hydrophilic colloid does not interfere with coagulant dispersal in the water or with floc formation.

4 Claims, No Drawings

PURIFICATION OF WATER

This is a continuation-in-part of copending application Ser. No. 107,921 filed on Oct. 9, 1987, now abandoned, which was a continuation of application Ser. No. 830,493 filed on Feb. 19, 1986, now abandoned, which was a continuation of application Ser. No. 658,056 filed on Oct. 4, 1984, now abandoned, which was a continuation of application Ser. No. 379,703 filed on May 19, 1982, now abandoned.

This invention relates, broadly, to the purification of water. More particularly, this invention relates to a composition and method for purifying water, suitable for, but not limited to, the use of the composition in tablet form for the batchwise purification of water to improve its suitability for human use.

Broadly, according to one aspect of the invention, there is provided a composition for the purification of water, which includes a suitable coagulant for coagulating solid impurities dispersed in the water to form flocs; and an organic hydrophilic colloid capable, when dispersed in the water, or absorbing large quantities of water to form a sol for aggregating the flocs, the proportion of organic hydrophilic colloid in the composition being such that when the composition is used to purify the intended quantity of water, the organic hydrophilic colloid does not interfere with coagulant dispersal in the water or with floc formation.

It will be appreciated that the composition, whether in powder, granular or tablet form as described hereunder, will be used at a required, desired or intended dosage rate, a specific quantity of composition being added to a specific volume of water to be purified. The dosage rate will be determined by the purity of the water to be purified, and by the purity required for such water after purification, and will be set by the amount of coagulant necessary to be introduced to the water to achieve this purification. In adding sufficient composition to the water to provide the necessary coagulant, it is critical not to add too much organic hydrophilic colloid at the same time. The reason for this is that an excess of hydrophilic colloid leads to rapid gel formation in the water, inhibiting coagulant dispersal in the water and inhibiting primary floc formation, thereby rendering the composition substantially useless for its intended purpose. It is thus essential to limit the ratio of organic hydrophilic colloid to coagulant in the composition to such values where the colloid does not interfere with coagulant dispersal or floc formation. This ratio will depend on the coagulant and colloid in question, and to a certain extent on the purity of the starting water and its intended use after purification. However, the Applicant has found that the proportion of colloid in the composition should be such that, when sufficient composition has been added to the water to provide the necessary quantity of coagulant for primary floc formation, the quantity of colloid in water should not exceed 50 mg/l, and is usually about 10 mg/l.

The coagulant may be such that the flocs, which are formed when it is dispersed in the water, are electrically charged, and the hydrophilic colloid may be such that the sol which is formed when it is dispersed in the water, is electrically charged and has a charge opposite to that of the flocs.

The composition may include a further (secondary) hydrophilic colloid capable, when dispersed in water, of absorbing large quantities of water to form a secondary sol to assist the original (primary) sol in the aggregation of the flocs, the proportions of original (primary) and secondary hydrophilic colloids in the composition together being such that when the composition is used to purify the intended quantity of water, the colloids together do not interfere with coagulant dispersal in the water or with floc formation.

The reason for this is the same as described for the primary colloid and the total proportion of colloid present should thus be such that when sufficient composition has been added to water to be purified to provide the necessary quantity of coagulant for floc formation, the total quantity of colloid in the water should not exceed 50 mg/liter.

The secondary colloid may also be such that the secondary sol which is formed when it is dispersed in the water, is electrically charged. This charge may be the same as and preferably opposite to that of the primary sol.

The secondary colloid may typically be in the form of a suitable polyelectrolyte. The polyelectrolyte may be a high molecular weight, water-soluble, synthetic organic flocculating material having non-ionic, anionic or cationic properties, such as polymers of amino or acrylic monomers and the polyelectrolyte may have a molecular weight of at least 100 000, but preferably 1 000 000, or higher.

Substances which have polyelectrolyte properties, such as casein, modified starches and celluloses, and gelatine, or non-ionic substances such as hydroxy ethyl- or propyl-cellulose which, together with the primary hydrophilic colloid, give a synergistic increase in the aggregation of the flocs, can be suitable as secondary hydrophilic colloids, provided that they are used at a pH which gives their sol the required electric charge.

The coagulant is selected, bearing in mind the nature of the water for which it is intended, e.g. its pH, temperature, the proportion and nature of the solid impurities dispersed therein, concentration of humic substances therein, etc, so that the coagulant acts with the prescribed quantity of water for which it is intended, to form said flocs which are preferably electrically charged. The primary hydrophilic colloid in turn may be selected to provide in the same quantity of the same type of water an electrically charged sol having a charge opposite to that provided on the flocs of the coagulant. The particles of the primary sol are attracted to and aggregate with the flocs to provide rapid floc size increase, i.e. secondary floc formation, leading to rapid and thorough clarification of the water in question. The primary hydrophilic colloid thus acts in a primary sense to promote the clarification of water which has been coagulated by the coagulant (hence the term 'primary' hydrophilic colloid).

Use of the secondary hydrophilic colloid further promotes rapid clarification of the water in question, by providing a secondary sol which aggregates with the primary sol, for rapid floc aggregation and size increase. The particles of the secondary sol aggregate with the particles of the primary sol, simultaneously with aggregation of the flocs produced by the primary flocs with the primary sol, and for this reason a secondary colloid which provides a sol of opposite charge to the primary sol is preferred.

In other versions of the invention, the primary and secondary colloids may, however, be such that electrically neutral primary and secondary sols respectively are formed when they are dispersed in the water, and the same applies to the coagulant, which can be selected to provide uncharged flocs.

The secondary colloid will also be selected, and its proportion in the composition will be determined, together with the proportions of the coagulant and primary colloid, bearing in mind the quantity of water and the nature of the water for which it is intended. The secondary colloid will be selected so that, when dispersed in the water in question, it provides the required proportion of the secondary sol of the required charge, which may be neutral, the same, or preferably opposite, to that of the primary sol.

Typically, the composition will be used for the batchwise treatment of relatively small quantities of water for human use, and the composition may thus be contained in a sachet or the like, or, as described hereunder, is preferably in the form of a tablet.

The coagulant may be an inorganic metal salt, such as aluminium sulphate, ferric chloride, ferrous sulphate, ferric sulphate, chlorinated copperas, sodium aluminate, or the like, with aluminium sulphate being preferred.

Ground surface waters, such as water obtained from rivers and dams, or even wells, often have suspended solid impurities which are organic in nature and are negatively charged. A coagulant such as aluminium sulphate wherein the cations combine with available hydroxyl ions to form charged primary flocs by coagulation of suspended solids thereby to clarify the water slowly, is thus suitable, if used in excess, to provide flocs which are substantially positively charged. In this regard, all the flocs need not be charged, but only a substantial proportion thereof, and they need not all be charged to the same extent.

The primary colloid may thus be selected to form a neutral or negatively charged sol and may be a polyelectrolyte. It may be an organic polymer, and may be a non-ionic polymer such as polyvinyl pyrrolidone, a polysaccharide (e.g. starch, cake flour, dextrans), or a modified cellulose (e.g. hydroxy ethyl cellulose and hydroxy propyl cellulose), or an anionic polymer such as modified polysaccharide (e.g. modified starch), modified cellulose (e.g. carboxy methyl cellulose), a protein (e.g. casein), or a gum (e.g. gelatine). Preferably, the primary colloid is carboxymethyl cellulose (or an acceptable salt thereof).

The composition may include a clay, such as bentonite, and may also include an inorganic compound such as activated silica (sodium silicate), silica gel or similar silica-based products of the type which rapidly absorb water and are used as desiccants and which may be synthetically produced, highly water-absorbent, and markedly swellable upon water absorption, such as the products available under the trade name SYLOIDS from W. R. Grace S. A. (Pty) Ltd. These substances are swelling agents which can act to aid in tablet disintegration and can also act as secondary colloids.

Mixtures of two or more of the above primary colloids can be used, and it should be borne in mind that the nature of the charge of the sol produced thereby can vary depending on the pH of the water so that in certain instances it may be necessary to include a pH-modifying agent, such as one of the common acids or bases, in the composition to ensure the correct pH for proper functioning of the primary colloid. Usually, the pH-modifying agent will be a base such as calcium hydroxide, sodium carbonate or, preferably, sodium bicarbonate.

Without being bound by theory, the Applicant thus believes that the primary and secondary colloids act synergistically in impure water to provide nucleation or aggregation centres for floc aggregation which adhere to and combine with the primary flocs to provide large and rapid settling floc aggregates for quick and effective water clarification. To this extent even hydrophilic colloids which provide neutral sols can act as aggregation or nucleation centres for floc size increases.

The Applicant further believes that the mechanism whereby the coagulant and the hydrophilic colloids function may be by cross-linking of the molecules of the hydrophilic colloids in the presence of the coagulant, which results in gel formation and subsequent precipitation of the gelled flocs. As mentioned above, the proportion of colloid present in the composition should be limited to prevent sol formation from interfering with coagulation. The Applicant thus believes that it is important that the coagulant should dissolve and act to form flocs (e.g. when aluminium sulphate reacts with hydroxyl ions available in the water) at a rate which is more rapid than the rate at which colloids hydrate to form sols as this results in effective distribution of the coagulant throughout the solution which is necessary for initial coagulation and formation of primary flocs, prior to sol formation and precipitation by the colloids as described above. Thus, the colloids should hydrate at a slower rate than the formation of the primary flocs, and after formation of the primary flocs they are aggregated by the hydrated colloids, i.e. in the gels. The polyelectrolytes, it is believed, also hydrate relatively slowly and promote formation of the sols.

The sols thus provide bases for rapid floc growth, and for this reason combinations of hydrophilic colloids with essentially opposite charges are preferred, but while they will generally be cationic or anionic, non-ionics are also regarded as suitable.

The composition of the invention will thus have the proportions of its coagulant, and primary and secondary colloids selected so that flocs are rapidly produced when the composition is added in the appropriate amount for the quantity of water to be treated, the proportion naturally increasing with increased impurity of the water as regards suspended solids. However, the Applicant has found that the dosage is not critical, and a single formulation (e.g. 500 mg tablet per liter of water) has been found effective with all water tested, provided that the colloid, as mentioned above, never reaches more than 50 mg/l in the water. The dosage can easily and rapidly be determined by experiment, simply by continuing to add the composition until enough or a slight excess has been added, whereupon rapid clarification is achieved.

If the water is intended for human consumption, its constituents will naturally be selected so as to be non-toxic in the quantities used, but when the water is merely to be clarified for purposes such as washing, a wider selection of constituents will become available. A further aspect to be borne in mind is that the gelatinous nature of the gel which can be formed by aggregation of the colloids can limit the choice of constituents, as the sediment or scum obtained should not be too gelatinous or slimy, as this can complicate separation.

The invention extends to a method of purifying water which comprise clarifying the water by dispersing a composition as described above in the water to be treated to flocculate suspended solid impurities, and separating the flocs from the clarified water, the quantity of composition added being such that the quantity of colloid in the water does not exceed 50 mg/liter.

The Applicant has found that efficient and rapid dispersion of the composition in the water is important to prevent the formation of gel lumps. Thus, while in the batchwise treatment of water a particulate composition, e.g. in sachets, can be dispersed effectively, care is needed in this, and a granulated composition would be more suitable. It is, however, preferred rather to use a tablet formulated to disintegrate rapidly and effectively in the water. This is the preferred form for use with unskilled or illiterate users.

According to the method, dispersion may be effected by rapid stirring of the water to promote coagulation or flocculation. Thereafter, the water should be stirred intermittently, to provide for aggregation of flocs and to promote large and rapid settling flocs. Once the flocs have settled, the clean water may be decanted or filtered. Said settling can be aided by centrifugation.

When the composition is in the form of a tablet, it may include an effervescent for providing effervescence when the tablet is dropped in water. Thus, depending on the coagulant used, the composition can contain a suitable carbonate or bicarbonate of an alkali metal or alkaline earth metal, capable of reacting with the coagulant in an aqueous environment to produce carbon dioxide effervescence and to promote disintegration of the tablet in water to disperse the composition of the tablet in the water.

For tabletting, the coagulant is preferably in granular or powdered form prior to tabletting, and the carbonate or bicarbonate may be a powder such as sodium bicarbonate, with sodium bicarbonate being preferred because of its ready availability at accepted cost, and acceptable taste and fitness for human consumption. In addition to providing effervescence for tablet dispersion, the carbonate or bicarbonate will generally be highly soluble in water, so that it can leach rapidly from the tablet to render the tablet porous and to provide for water access to the reactive surfaces of other components in the tablet for rapid disintegration. The carbonate or bicarbonate can be important (depending on the pH of the water treated) for the production of hydroxyl ions in the water to promote coagulation by the coagulant, by the formation of the hydroxide of the metal ions in the coagulant. Other readily leachable acid salts of alkali metals or alkaline earth metals, such as potassium or lithium carbonate or bicarbonate, may be included in the composition, for promoting tablet disintegration. In tabletting, a substance such as calcium hydroxide is not suitable for the production of hydroxyl ions, as they are released too slowly and gelation occurs prematurely.

When the composition of the invention is for producing purified water for human consumption, the tablet may include a suitable bactericide, which may be a source of chlorine or iodine. A source of organochlorine such as a cyanurate or halazone (para para dichloro sulphamoyl benzoic acid), or a source or organo-iodine, such as tetraglycine hydroperiodide, or an inorganic chlorine source, such as a suitable hypochlorite can be included. Preferably, the source should be fast-dissolving. Lithium hypochlorite or calcium hypochlorite have been used by the Applicant, the latter being preferred for its free availability, and it is preferably, like the coagulant, granular to aid in tabletting.

For tabletting, it should be noted that several of the primary colloids mentioned above have additional advantages. Thus, certain of them are strong adsorbents of flocs produced by the coagulant, and of bacteria and other suspended solid impurities, and combinations of certain of these primary colloids can be synergistic in this regard. Bentonite and the Syloids (trade mark) which may be included in the composition, can also have at least some of these properties. Furthermore, those hydrophilic colloids used which are rapid absorbers of large quantities of water to act as swelling agents to provide rapid swelling, can aid markedly in tablet disintegration. Bentonite (which is also a swelling agent to promote rapid tablet disintegration) or polyethylene glycol (which is also a hydrophilic colloid and a tablet lubricant), may be added to the composition for tabletting, as a binder. A further swelling agent, such as activated alum, containing aluminium sulphate and some clay particles, and being activated in that it contains a relatively reduced proportion of water of hydration, may also be added to the composition for tabletting.

A formulation which the Applicant believes has used successfully on a large variety of waters includes aluminium sulphate as the coagulant; sodium bicarbonate as effervescent and alkali in a proportion so that the tablet when used with the prescribed amount of water provides a pH of about 5.5 to 6.0; carboxymethyl cellulose as a primary colloid; bentonite as an additional substance (having the primary functions of being a lubricant and binder for tabletting and a rapid swelling water absorber for tablet disintegration, but which also acts as an absorbent of pollutants, an inorganic substance unaffected by chlorine and a weighting agent to weight down flocs which have entrained air, thereby to assist the flocs in settling); a suitable Syloid (primarily as a dispersant but also as a potential absorber of pollutants); and as a secondary colloid a polyelectrolyte such as a 'Magnafloc LT25' (anionic) or 'Magnafloc LT20' (non-ionic), available from Allied Chemicals SA (Proprietary) Limited. Halazone is the preferred bactericide. The Applicant has found that in practical formulations of the composition the primary colloid can comprise, in addition to, or instead of, the carboxy methyl cellulose, other hydrophilic colloids such as modified starches, modified celluloses, gelatine, polyvinyl pyrrolidone. The suitability of these compounds is determined by their suitability for a particular water, which is in contrast to hydrophilic colloids such as carboxy methyl cellulose, which has been found effective for all waters tested. The secondary colloid, depending on its pH, can also be casein, hydroxy ethyl cellulose or hydroxymethyl cellulose, or other suitable polyelectrolytes.

The Applicant believes that, in addition to killing of bacteria by the bactericide, physical separation of bacteria from the water takes place because of entrapment or adsorption of the bacteria in or to the flocs or gel produced, reducing the bacterial count of the water. The Applicant has also found that there is a rapid separation of organic suspended solids from the water in question, and this separation of organic material and bacteria allows a relatively low level of chlorine to be used, enhancing the acceptability of the clarified water for human consumption.

Generally, the tablet according to the invention will be formulated for treating water of a certain type, e.g. river water, for a certain purpose, e.g. drinking or washing, and the components and proportions thereof will be selected accordingly. It is contemplated that tablets of various weights or sizes will be made, each intended to treat a particular volume of water. Where effective function of certain constituents of the tablet is pHrelated, the constituents and their proportions will be selected so that when the tablet is used with the prescribed volume of the water which it is intended to purify, a suitable pH is attained. This will usually be in the range 5.0–7.0, e.g. about 6.0, but when certain components act optimally at different pH's, some compromise will be required. If an increase in pH is required, a suitable alkali, e.g. sodium carbonate (which can provide effervescence), may be added to the tablet, and as the coagulant is usually acidic, no special steps to decrease pH are ever expected to be needed. Usually, however, the carbonate or bicarbonate used with the coagulants should result in a pH of a suitable value.

Typically, tablets according to the invention will be packed in packages of synthetic plastics material to keep them dry. The tablets will be used by persons, such as the military, who are outdoors or remote from treated water supplies, to treat water from rivers, dams, wells, or the like. Generally, water will be treated on a batch basis, e.g. a bottle, drum, tank or reservoir of water will have the appropriate mass of tablets added thereto, to cause flocculation and, if desired, sterilization for consumption. After clarification, the water may be left for a sufficient time or treated to remove any objectionable smell or taste, e.g. residual excess chlorine removable with activated carbon, and may be decanted and then filtered to remove floating flocs or sediment.

The tablet, in a single operation, can both clarify and sterilize water to remove colloids or other suspended materials contained therein, and to kill bacteria or the like potentially disease-causing organisms. Swirling, stirring, or shaking the water can accelerate tablet disintegration and dispersion of its constituents in the water for rapid purification, and particularly when the water is not needed for drinking, simple settling of sediment, or skimming if necessary, may be sufficient, without filtration.

The Applicant has found that the constituents of the formulation can easily be mixed mechanically to obtain a homogeneous blend which can easily be pressed into tablets in a conventional tabletting machine. A suitable general purpose tablet can contain about 40% by mass bentonite, 30% by mass of aluminium sulphate, about 20% by mass of sodium bicarbonate, about 5% by mass of halazone or hypochlorite, about 2% by mass of primary colloid, preferably carboxy methyl cellulose in the 7H range (i.e. having a degree of substitution about 0.7 and a high viscosity), about 2% by mass of Syloid as dispersant and desiccant, and 0.15% by mass of polyelectrolyte.

The Applicant has found that the optimal concentration of carboxymethyl cellulose in the tablet is about 2% by mass. At a concentration of about 5% by mass, dissolution of the tablet is impaired by gel formation around the tablet (preventing coagulant dispersion and floc formation). At a concentration of about 10% by mass, substantially no dissolution takes place due to said gel formation.

While the tablet can be formulated without SYLOID (trade name), the Applicant has found that most effective results are obtained where SYLOID (trade name) is used, as a result of the synergistic effect of the other colloids and the SYLOID (trade name), as a result of improved dispersal.

Typically, a tablet or tablets can be added to a batch of water to be treated at a dosage rate of about 500 mg composition per liter of water. Immediate effervescence is obtained, coupled with rapid (within 30 seconds) total disintegration of the tablet. Rapid floc formation and growth takes place, and, with gentle swirling of the water, floc formation proceeds to completion with large flocs which settle or float, within a further 2 to 3 minutes after disintegration. This water can then be filtered, e.g. through a domestic (bathroom) towel or the like, and has been found, apart from a slight smell of chlorine which dissipates rapidly or can be removed by activated carbon, to be fit for human consumption. This was tested on water drawn from a stream immediately downstream of a sewage outlet which after treatment was found to be drinkable.

Subject to certain constraints, such as a pH at which the constituents will perform the intended functions, the proportions of the constituents can be varied between limits.

In tests conducted with the invention by the South African Bureau of Standards, clarified water with 1.50 ppm chlorine in the supernatant has had its bacterial count reduced from 224 000/ml to 2/ml in about 20 minutes after addition of a tablet as hereinbefore described, to the appropriate quantity of water. Coliforms from faecal contamination were reduced from 1800/ml to zero in about 20 minutes, and it is believed that a particular advantage of the invention is that the effective and rapid floc formation leading to physical separation of bacteria from the water, materially assists in the reduction in bacterial count, at the low chlorine levels used. Further tests with chlorine in the supernatent at 1.5 ppm reduced the bacterial count from 130 000/ml to 5/ml in about 10 minutes.

The Applicant regards as an important advantage of the invention the fact that water can be rapidly and effectively clarified using acceptably low concentrations of polyelectrolytes, as some of these can be potentially toxic in high concentrations (especially with regard to free acrylamides contained therein), with generally accepted levels being 0.5 to 1 mg/l.

The invention will now be described with reference to the following non-limiting illustrative Examples:

EXAMPLE 1

A 500 mg tablet for treating one liter of water typically has the following formulation in parts by mass:

| Parts by mass | Constituent |
| --- | --- |
| 3 | Aluminium sulphate (granular) |
| 4 | Bentonite (powder) |
| 2 | Sodium bicarbonate (powder) |
| 0.3 | Calcium hypochlorite (granular) or halazone |
| 0.2 | Grade 7HOF or 7H3SF sodium carboxymethyl cellulose (powder ex Hercules Inc.) |
| 0.2 | 'Syloid 224' (powder ex WR Grace SA (Pty) Limited) |
| 0.03 | 'Magnafloc LT20' (powder ex Allied Chemicals SA (Pty) Ltd) |
| 0.2 | Polyethylene glycol 600 (powder). |

EXAMPLE 2

A 10 g tablet for treating 20 liters of water, typically has the following formulation in parts by mass:

| Parts by mass | Constituent |
| --- | --- |
| 3 | Aluminium sulphate (granular) |
| 4 | Bentonite (powder) |

| Parts by mass | Constituent |
|---|---|
| 2 | Sodium bicarbonate (powder) |
| 0.3 | Calcium hypochlorite (granular) or halazone |
| 0.2 | Grade 7HOF or 7H3SF sodium carboxymethyl cellulose (powder) ex Hercules Inc |
| 0.2 | 'Syloid 224' (powder ex WR Grace SA (Pty) Ltd) |
| 0.015 | 'Magnafloc LT20' (powder ex Allied Chemicals SA (Pty) Ltd) |
| 0.2 | Polyethylene glycol 600 (powder). |

In the Examples, the carboxymethyl cellulose can be replaced with the same quantity of casein, in which case the Magnafloc LT20 will be replaced with the same quantity of Magnafloc LT25. Also, the polyelectrolyte ('Magnafloc LT20') can be replaced with 1% (by mass) hydroxy ethyl cellulose.

The constituents in the Example were mixed mechanically to obtain a homogeneous blend. Tablets were pressed therefrom, using a conventional tabletting machine. The tablets were tested on river water from the Apies River in the Pretoria district, drawn immediately downstream of a sewage outlet. The composition in tablet form (which could also be used as a powder, e.g. in sachet form), was added to either a one liter or 20 liter sample of the river water, which had a high suspended solids/colloids content and a high probability of contamination by disease-bearing organisms from the sewage, the addition being in a quantity equivalent to 170 mg AlSO4/liter water. Immediate effervescence was noted, coupled with rapid total dispersion of the constituents. Rapid floc formation and growth took place and with gentle swirling of the water, floc formation had proceeded to completion with large stable flocs which settled or floated to the top of the water within a further 2-3 minutes after dispersion, in the case of the 1 liter sample of water, and 8-10 minutes after dispersing in the case of the 20 liter sample of water. The water was filtered through a domestic (bathroom) sponge and was found, apart from a slight smell of chlorine which dissipated rapidly, or could be removed with activated carbon, to be fit for human consumption; it was in fact consumed with no ill effects.

It will be appreciated that the formulation may be varied, as regards types of constituents and proportions thereof, within limits, without departing from the invention, depending on what is desired for the composition in question. Thus, using as a basis a quantity of coagulant which is fixed for the anticipated flocculation load— the proportion of carbonate or bicarbonate for effervescence can be varied from a minimum set by the lowest acceptable dispersion time and a maximum (for fast dispersion) set by objectionable taste (e.g. for NaHCO3), or the like;

the proportion of bactericide, if any, will have a minimum determined by the proportion needed for effective water sterilization and can vary over a wide range;

for a tablet, the binder (e.g. bentonite) will have its minimum determined by the proportion needed for effective tabletting and tablet strength;

the properties of polyvinyl glycol can be varied, but when it is present in the composition in an amount in excess of about 1.5% by mass, a milky white haze is formed in the water;

the proportion of silica swelling agent will have its minimum set by the proportion required for effective swelling and its maximum set by the proportion which interferes with tablet binding, bearing in mind that it also can act as a flocculation aid; and the proportion of activated alum (if used) will be set according to similar considerations to the swelling agent, bearing in mind that it has a dual function as a swelling agent and as a flocculation aid, and bearing in mind that an excess of both swelling agent and/or alum can lead to unacceptable tablet brittleness.

In every formulation the proportions of constituents are limited also by the requirement that the treated water, in the prescribed quantity, must have a pH falling within a range such that all the constituents can perform their intended functions, particularly the coagulant and disinfectant; and (for tablets) so that, in combination, when the carbonate or bicarbonate leaches out of the tablet and reacts with the coagulant, rapid, easy excess to the reactive surfaces of the swelling agent(s) (silica swelling agent, binder, and/or clay) used for rapid and effective disintegration is obtained.

In cases where the composition is used in powder form and contains carboxymethyl cellulose, the powders can be in granulated form to effect efficient dispersal thereof.

Hence, according to the first aspect of the invention, the composition may comprise, broadly, an unreacted solid inorganic metal salt having a trivalent cation as a coagulant for rapidly coagulating solid impurities dispersed in water to form primary flocs, and an unreacted solid alkali which is soluble in water as a coagulant promotor; and an anionic polymeric hydrophilic colloid capable, when dispersed simultaneously with the coagulant combination in the water, of hydrating to form a sol for aggregating flocs, with the rate of hydration of the colloid being slower than the rate of formation of the primary flocs.

The unreacted solid inorganic metal salt and unreacted solid alkali hence together form a coagulant combination. The mass ratio of unreacted solid inorganic metal salt to unreacted solid alkali in the coagulant combination may be between 4:1 and 1:1.

The mass ratio of coagulant combination to anionic polymeric hydrophilic colloid may be between 450:1 and 15:1.

| The composition may comprise | |
|---|---|
| unreacted solid inorganic metal salt having trivalent cation | 30% to 60% by mass |
| unreacted solid alkali | 15% to 30% by mass |
| anionic polymeric hydrophilic colloid | 0.2% to 3% by mass |

More particularly, the composition may comprise, by mass

30% to 60%, e.g. 40-55%, inorganic metal salt, as coagulant;

15% to 30%, e.g. 18-25%, alkali metal acid salt such as a carbonate or bicarbonate thereof, as the solid alkali;

55% to 4%, e.g. 35-20%, clay;

0.2% to 3%, e.g. 1.0-2.5%, organic polymer as primary hydrophilic colloid;

0.2% to 3%, e.g. 1.0-2.5%, silica-based substance;

0.1% to 0.2%, e.g. 0.15-0.18%, polyelectrolyte as secondary colloid.

In particular, the composition may then comprise, by mass, approximately 50% aluminium sulphate as the coagulant;

approximately 20% sodium bicarbonate as the alkali metal acid salt;

approximately 26% bentonite as the clay;

approximately 2% carboxy methyl cellulose (Grade 7H) as the primary hydrophilic colloid;

approximately 2% synthetic silica compound available under the trade name SYLOID 224 as the silica-based substance;

approximately 0.175% SUPERFLOC N100 (trade name) (available from American Cyanamid Ltd) as the secondary colloid.

The Applicant has found that by having an inorganic metal salt with the trivalent cation content or proportion in excess of 30%, e.g. 40–60%, a more universal composition is obtained. In particular, the composition is then suitable for purifying water having very high contaminant colloid level, e.g. up to about 2000 ppm. Furthermore, the composition is then suitable for purifying water to acceptable low tannin levels as prescribed by the U.S.A. Environmental Protection Agency ('EPA') in 1986.

Broadly, according to a second aspect of the invention, there is provided a composition for the purification of water, which includes a suitable coagulant for rapidly coagulating solid impurities dispersed in the water to form primary flocs;

a micro-biocide capable of killing off micro-organisms in the water during, or prior to, primary floc formation;

an organic hydrophilic colloid capable, when dispersed simultaneously with the coagulant and bactericide in the water, of hydrating to form a sol for aggregating the primary flocs into larger secondary flocs, the proportion of organic hydrophilic colloid in the composition being such that when the composition is used to purify the intended quantity of water, the organic hydrophilic colloid does not interfere with coagulant dispersal in the water or with primary floc formation so that the rate of hydration of the colloid is hence slower than the rate of formation of the primary flocs; and an active agent capable of being aggregated by the hydrophilic colloid with the primary flocs, into the secondary flocs, and also being capable of killing off micro-organisms in the secondary flocs.

As mentioned hereinbefore, the composition can be in unit dosage form, for the single step batch purification of a relatively small predetermined volume of water. Furthermore, the coagulant can be an unreacted solid inorganic metal salt having a trivalent cation, and the composition can also comprise an unreacted solid alkali which is soluble in water, as a coagulant promotor. As also mentioned hereinbefore, the hydrophilic colloid can be an anionic hydrophilic colloid.

The micro-biocide can be capable of releasing a micro-biocidally effective amount of a micro-biocidal agent into the water, at a rate no slower than the rate of formation of the primary flocs.

The Applicant has found that certain micro-organisms such as bacteria, algae and viruses are readily killed off or nullified in water by means of a micro-biocide which is introduced into the water at relatively low concentrations, e.g. concentrations of the microbiocidal agent which are sufficiently low to permit the treated water to be fit for human consumption. Most of these micro-organisms are also aggregated by the hydrophilic colloid into the secondary flocs. However, in the event of some of these micro-organisms not being aggregated into the secondary flocs and being retained in the water during separation of the secondary flocs from the water, e.g. due to the smallness of the micro-organisms, especially viruses, then such micro-organisms will hence be present in the water in inactive form.

However, the Applicant has also found that at times certain micro-organisms are still present in the primary and/or secondary flocs in active form. One such class of micro-organisms are cysts, such as those of *Giardia lamblia, Giardia maoris* and *Cryptosporidium*. Applicant has found that the micro-biocide is often incapable of killing off such cysts prior to, or during, primary floc formation, especially at low water temperatures, e.g. below 20° C., due to, inter alia, its low concentration. Thus, the Applicant has found that a CT value ('C'=concentration of active agent in medium, in mg/l, multiplied by 'T'=time, in minutes) of at least 800 is required to kill off cysts, especially at low water temperatures. This is achieved with the active agent since the flocs occupy a relative small proportion of the water volume, typically less than 5%, with substantially all the active agent being present in or on the flocs, resulting in a relatively high, and hence effective, localized active agent concentration in the flocs with the micro-organisms hence also being concentrated in the flocs. Hence, the active agent concentration, based on the liquid volume, is relatively low, e.g. for human consumption constraints. The killing off of the cysts in the flocs, i.e. in the residual sludge, also serves to render the sludge non-infective.

The active agent can also be a micro-biocide or disinfectant, this second micro-biocide hence differing from the other or first micro-biocide in that it must be capable of releasing a micro-biocidally effective amount of a micro-biocidal agent into the water at a rate slower than the rate of formation of the primary flocs and it adheres to or is encaptured by the flocs.

The active agent can be selected to be an anti-metabilite substance, such as a sulphonamide.

While the micro-biocides can be chlorine or iodine containing, it is believed that chlorine containing compounds will be preferred due to their ready availability. Hence, the first micro-biocide can be a rapidly dissolving chlorine containing compound resulting in immediate release of chlorine into the water, while the second micro-biocide can be slower dissolving chlorine containing compound which releases its chlorine into the water at a slower rate.

The first micro-biocide may comprise one or more of sodium dichloro isocyanurate ('Puritabs'—trade name), potassium-dichloro-isocyanurate, and/or Globaline (trade name) which contains iodine rather than chlorine.

The second micro-biocide may comprise one or more of halazone (para-para-dichloro-sulphamoyl-benzoic acid), chloramine T (trade name), dichloro-dimethyl-hydantoin and/or bromo-chloro-dimethyl-hydantoin.

A compound such as trichloroisocyanuric acid can be used, if desired. Such a compound will then act as both first and second micro-biocide since a portion (about 60%) of its chlorine as released immediately on introduction into water, while a portion (about 30%) is released more slowly. Furthermore, it is to be understood that if primary flocculation is rapid and effective, substances such as dichloroisocyanurates can also function in a similar fashion to trichloroisocyanuric acid.

According to a third aspect of the invention, there is provided a method of purifying water, which includes coagulating solid impurities dispersed in a volume of water, to form primary flocs;

killing off micro-organisms in the water during, or prior to, primary floc formation;

forming a sol in the water such that it does not interfere with primary floc formation;

aggregating the primary flocs into larger secondary flocs by means of the sol;

killing off micro-organisms in the secondary flocs; and thereafter separating the flocs from the water.

The method may be effected by dispersing a composition according to the second aspect of the invention in the water, the quantity of composition added being such that the quantity of colloid in the water does not exceed 50 mg/l.

A formulation according to the second aspect of the invention, which the Applicant believes can be used on a large variety of waters includes aluminium sulphate as the coagulant; sodium bicarbonate as the coagulant promotor; carboxymethyl cellulose as a colloid; bentonite as an additional substance as hereinbefore described; a suitable SYLOID as hereinbefore described; as a secondary colloid a polyelectrolyte such as a polyacrylamide; sodium dichloro-isocyanurate as a first microbiocide; and halazone as a second microbiocide.

Typically, such a formulation can comprise or consist of the following (proportions by mass):

| | |
|---|---|
| aluminium sulphate | 40–60% |
| bentonite | 20–25% |
| sodium bicarbonate | 15–25% |
| carboxymethylcellulose | 1–3% |
| Syloid | 1–3% |
| polyacrylamide | 0.02–0.15% |
| sodium dichloroisocyanurate | 0.5–3%. |
| halazone (optional) | 1–4% |

More particularly, a suitable general purpose tablet according to the second aspect can contain about 22% by mass bentonite, about 50% by mass of aluminium sulphate, about 20% by mass of sodium bicarbonate; about 2.5% by mass sodium dichloroisocyanurate, about 2% by mass of primary colloid, preferably carboxy methyl cellulose in the 7H range, i.e. having a degree of substitution about 0.7 and a high viscosity, about 2% by mass of SYLOID as dispersant and dessicant, and about 0.1% by mass of polyelectrolyte.

Typically, a tablet or tablets can then be added to a batch of water to be treated at a dosage rate of between 50 mg composition per liter and 1.5 gm/l, e.g. between 100 mg/l and 1 gm/l, typically about 500–600 mg composition per liter of water.

A specific non-limiting illustrative Example of a composition according to the second aspect of the invention, is given in Example 3.

EXAMPLE 3

A 600 mg tablet for treating one liter of water typically has the following formulation, in parts by mass:

| Parts by mass | Constituent |
|---|---|
| 50 | Aluminium sulphate (granular) |
| 22.42 | Bentonite (powder) |
| 20 | Sodium bicarbonate (powder) |
| 2.5 | Halazone |
| 1 | Sodium dichloroisocyanurate |
| 2 | Grade 7HOF or 7H3SF sodium carboxymethyl cellulose (powder ex Hercules Inc) |
| 2 | 'SYLOID 224' (powder ex WR Grace SA (Pty) Ltd) |
| 0.08 | Polyacrylamide. |

The tablet formation can be as described hereinbefore with reference to Examples 1 and 2.

The tablets were tested on simulated 'worst case' water as defined by the EPA in 1986. The water contains colloids, tannin and salts, and high levels ($10^6$–$10^9$) per liter of water bacteria, viruses and cysts of $G.$ $lamblia$. The composition in tablet form (but which could also be used as powder, e.g. in sachet form), was added to a one liter sample of the water. Immediate effervescence was noted, coupled with rapid total dispersion of the constituents. Rapid primary floc formation and growth took place. With gentle swirling of the water, floc formation proceeded to formation of large stable secondary flocs which settled or floated to the top of the water within a further 2–3 minutes after dispersion. It was found that the chlorine level in the clarified water (i.e. 'free chlorine') was 3 ppm, while when the water was stirred, the total residual chlorine level in the suspension was 6 ppm, indicating 3 ppm, based on total volume, of chlorine being present in the flocs. However, the residual chlorine is absorbed into the flocs which occupy about 5% of the water volume. Hence, the effective concentration of the residual chlorine, based on the floc volume, is about 60 ppm, i.e. 20 times 3 ppm, so that a high CT value in excess of 800 is obtained after 15 minutes. This is particularly effective since up to 99% of all micro-organisms can be trapped in the flocs, leading to effective killing of these microorganisms. The water was filtered through a domestic (bathroom) sponge and was found, apart from a slight smell of chlorine which dissipated rapidly, or could be removed with activated carbon, to be fit for human consumption; it was in fact consumed with no ill effects and the flocs were found to be sterile.

The Applicant has found that the composition according to the second aspect of the invention, complies with U.S.A. Environmental Protection Agency ('EPA') standards published in 1986 for efficacy in the purification of polluted water, particularly as regards $Giardia$ $lamblia$ micro-organisms.

We claim:

1. A composition for the purification of water which is in unit dosage form for the single step batch purification of a relatively small predetermined volume of water, and which comprises:

40–60% (by mass) aluminum sulphate as a coagulant for rapidly coagulating solid impurities dispersed in the water to form primary flocs;

15–25% (by mass) sodium bicarbonate as a coagulant promotor;

20–25% (by mass) bentonite as a clay;

0.5–3% (by mass) sodium dichloroisocyanurate as a first micro-biocide capable of releasing a microbiocidally effective amount of a micro-biocidal agent into the water at a rate no slower than the rate of formation of the primary flocs, thereby to kill off micro-organisms in the water during, or prior to, primary floc formation;

1-3% (by mass) carboxymethylcellulose as an organic hydrophilic colloid capable, when dispersed simultaneously with the coagulant and first micro-biocide in water, of hydrating to form a sol for aggregating the primary flocs into larger secondary flocs, the proportion of organic hydrophilic colloid in the composition being such that when the composition is used to purify the intended quantity of water, the organic hydrophilic colloid does not interfere with coagulant dispersal in the water or with primary floc formation so that the rate of hydration of the colloid is hence slower than the rate of formation of the primary flocs;

1-3% (by mass) synthetic silica compound as a silica-based substance;

0.02-0.15% (by mass) polyacrylamide as a secondary colloid; and 1-4% (by mass) halazone as a second micro-biocide capable of being aggregated by the hydrophilic colloid with the primary flocs, into the secondary flocs, and also being capable of killing off micro-organisms in the secondary flocs, the second micro-biocide hence differing from the first micro-biocide in that it is capable of releasing a micro-biocidally effective amount of a second micro-biocidal agent into the water at a rate slower than the rate of formation of the primary flocs.

2. A composition, in unit dosage form, for the single step batch purification of a relatively small predetermined volume of water, comprising:

approximately 50% (by mass) aluminum sulphate as a coagulant in the form of an unreacted solid inorganic metal salt having a trivalent cation, for rapidly coagulating solid impurities dispersed in water to form primary flocs;

approximately 20% (by mass) sodium bicarbonate as a coagulant promotor in the form of an unreacted solid alkali which is soluble in water;

approximately 26% (by mass) bentonite as a clay;

approximately 2% (by mass) carboxy methyl cellulose (Grade 7H) as an anionic polymeric hydrophilic colloid capable, when dispersed simultaneously with the coagulant and coagulant promotor in the water, of hydrating to form a sol for aggregating primary flocs, with the rate of hydration of the colloid being slower than the rate of formation of the primary flocs;

approximately 2% (by mass) synthetic silica compound as a silica-based substance; and approximately 0.175% (by mass) polyelectrolyte as a secondary colloid.

3. A composition for the purification of water comprising about 30% (by mass) aluminium sulphate as a coagulant for rapidly coagulating solid impurities dispersed in water, and having a trivalent cation;

about 20% (by mass) sodium bicarbonate which is soluble in water and which also acts as an effervescent;

about 5% (by mass) bactericide for disinfecting the water;

about 2% (by mass) anionic modified cellulose capable when dispersed in water, of forming a sol for aggregating flocs comprising coagulated impurities and the trivalent cations of the aluminium sulphate, the dispersal rate of the cellulose being such that when the composition is used to purify the intended volume of water, it does not interfere with coagulant dispersal in the water;

about 40% (by mass) swellable bentonite as further swelling agent;

about 2% (by mass) amorphous silica compound as yet a further swelling agent;

up to 0.15% (by mass) further secondary non-ionic synthetic polymer capable, when dispersed in the water, of forming a secondary sol to assist the original (primary) sol in the aggregation of the flocs, the proportions of the anionic modified cellulose and the non-ionic synthetic polymer in the composition together being such that when the composition is used to purify the intended volume of water, the modified cellulose and synthetic polymer together do not interfere with coagulant dispersal in the water or with floc formation.

4. A composition which is in the form of a tablet and which includes

| | |
|---|---|
| aluminium sulphate as a coagulant for rapidly coagulating solid impurities dispersed in water to form primary flocs | about 30% (by mass); |
| sodium bicarbonate as a solid alkali | about 20% (by mass); |
| bactericide | about 5% (by mass); |
| anionic modified cellulose as a polymeric hydrophilic colloid, capable when dispersed simultaneously with the coagulant in the water, of hydrating to form a sol for aggregating the flocs, the rate of hydration of the colloid being slower than the rate of formation of the primary flocs | about 2% (by mass); |
| swellable bentonite as further swelling agent | about 40% (by mass); |
| amorphous silica compound as yet a further swelling agent | about 2% (by mass); and |
| further secondary anionic synthetic polymer | up to 0.15% (by mass). |

* * * * *